April 6, 1937.    J. M. LEAKE    2,076,344
LAWN MOWER WHEEL
Filed Aug. 4, 1933    2 Sheets-Sheet 1
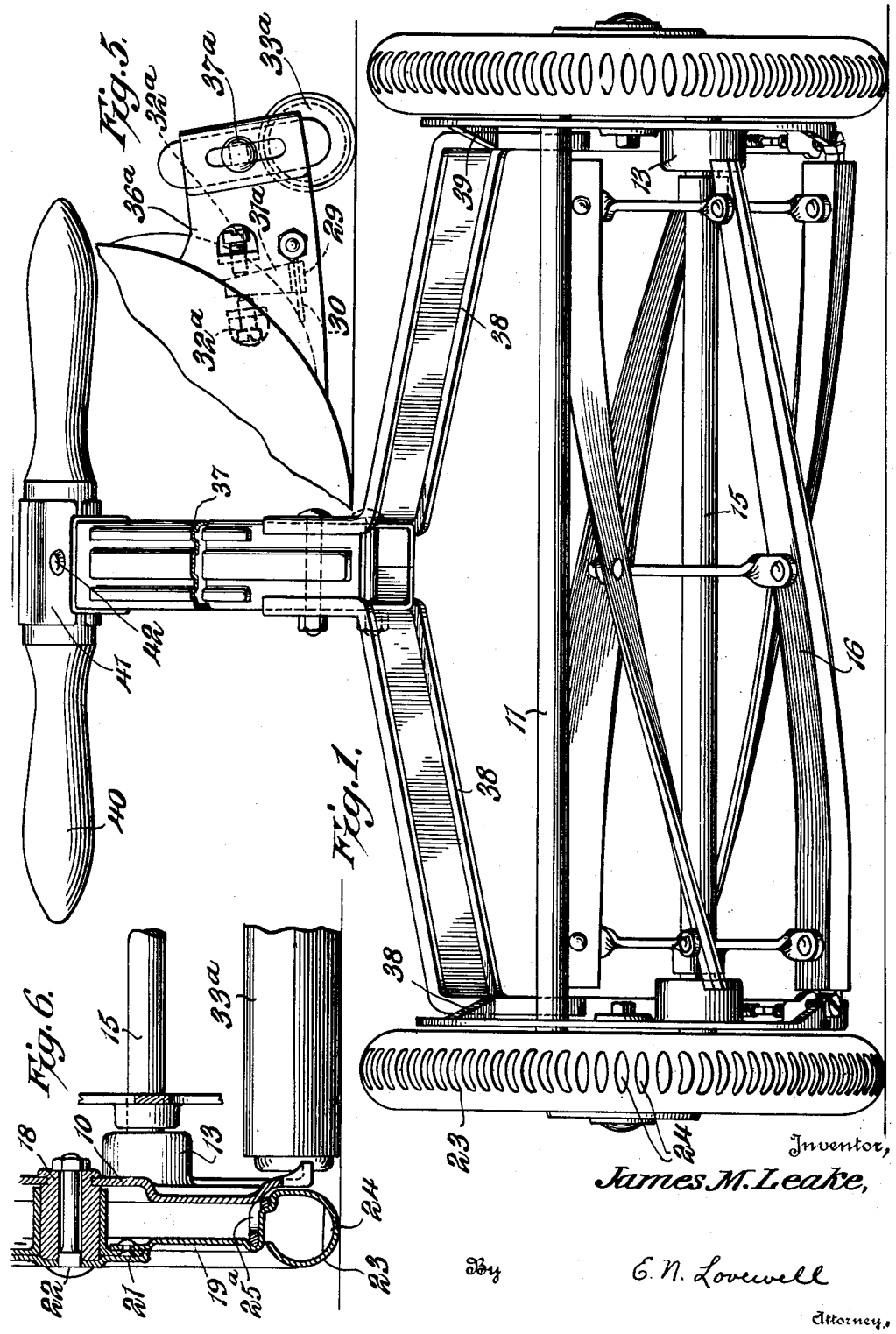
Inventor,
James M. Leake,
By
E. N. Lovewell
Attorney.

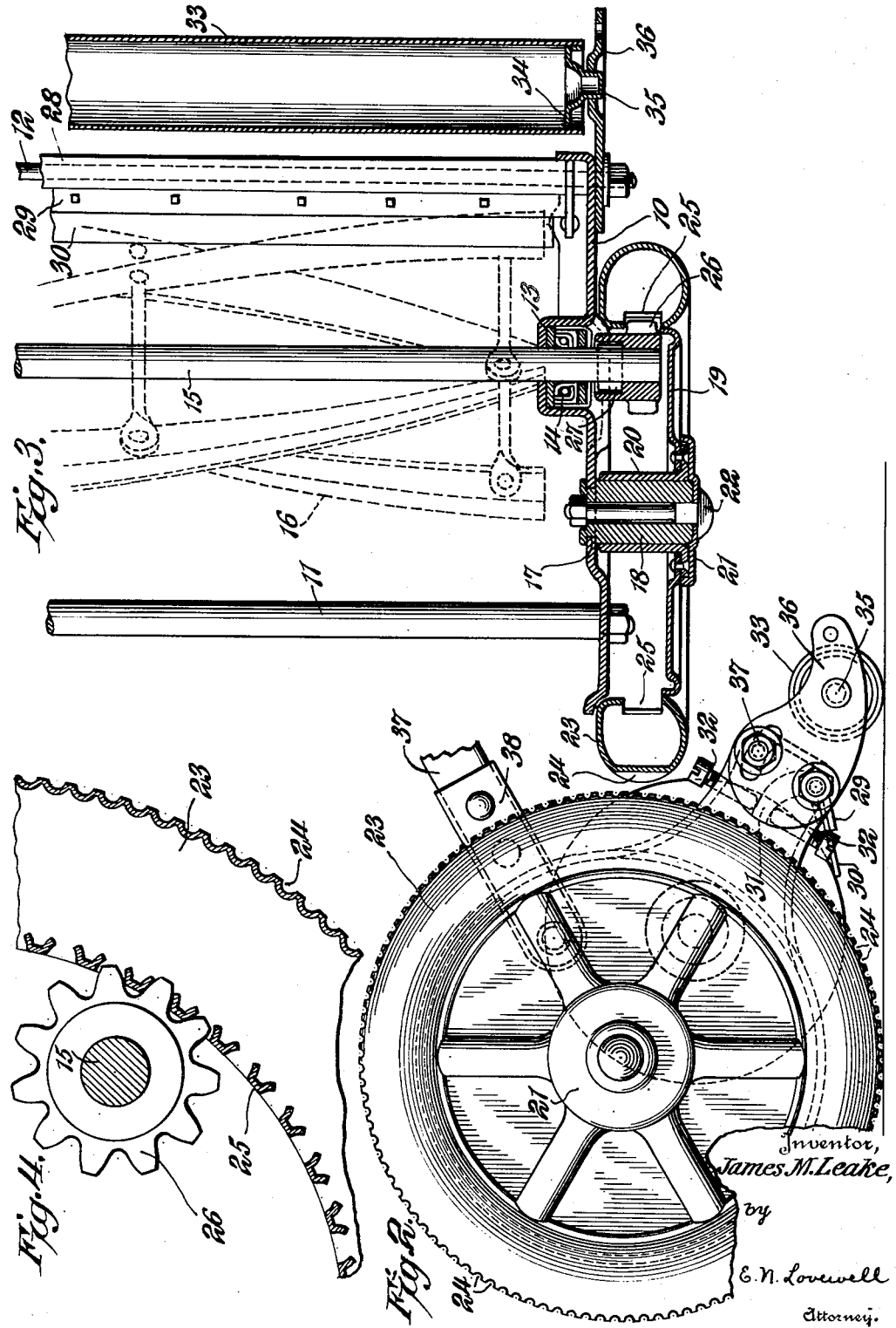

Patented Apr. 6, 1937

2,076,344

UNITED STATES PATENT OFFICE 2,076,344

LAWN MOWER WHEEL

James M. Leake, Toledo, Ohio

Application August 4, 1933, Serial No. 683,672

1 Claim. (Cl. 301—6)

The object of the present invention is to provide a lawn mower of improved construction which may be manufactured on a large scale at a low cost, which is of light weight, yet strong and durable, and which operates efficiently.

In the preferred form of the invention, the gears, as well as the ground wheels and frame, are made entirely of sheet metal stampings and novel, adjustable means are provided for supporting the bed knife uniformly throughout its length. The invention also includes various details of construction and combinations of elements, the advantages of which will be hereinafter described in detail.

The specific construction by which the desired objects are attained will be described with reference to the accompanying drawings, in which,—

Figure 1 is a front elevation of a lawn mower constructed according to the invention.

Figure 2 is a partial side elevation of the same.

Figure 3 is a horizontal sectional view of one side of the lawn mower.

Figure 4 is a detail view of the driving gears.

Figure 5 is a detail view of a modified form of ground roller support and bed knife adjusting means, and Figure 6 is a detail view of a modified form of driving gear.

As shown in the drawings, the frame of the lawn mower comprises side plates 10 stamped from heavy gauge sheet metal and rigidly connected by transverse rods 11 and 12. Each side plate 10 is formed with a boss 13 to receive the ball bearings 14 in which the shaft 15 of the rotary cutting reel 16 is mounted.

Each side plate 10 is formed with a hole 17 in which a hub 18 is anchored. The ground wheel 19, also stamped from sheet metal, has a central bearing sleeve 20 secured thereto and adapted to rotate on the hub 18. The wheel is retained on the hub by a hub cap 21 which is secured to the hub by a bolt 22.

The peripheral portion or rim 23 of the wheel 19 is preferably tubular and integrally connected to the interior or disk portion to which the sleeve 20 is secured. As herein shown, the rim is similar in shape to an automobile tire with transverse furrows 24, in order to secure sufficient traction, even though the frame is of very light weight. The inside of the rim 23 is formed with internal gear teeth 25 adapted to mesh with and drive a pinion 26 which is connected to the cutter shaft 15 by a clutch 27.

A split sleeve 28 is mounted on the rod 12 and is formed with flanges 29 between which the bed knife 30 is secured for cooperation with the knives of the rotary cutting reel 16. This sleeve is longer than the bed knife so that the latter is rigidly supported throughout its entire length. The sleeve 28 is formed at each end with an arm 31 which extends between two adjusting screws 32 mounted in the adjacent side plate 10 for adjusting the bed knife 30 into proper relation to the cutting reel 16.

The mower frame is supported at the rear in the usual manner by a ground roller 33, which is tubular with its ends 34 suitably secured therein and formed with bearing portions 35 rotatably mounted in the side plate extensions 36. These extensions have adjustable pin and slot connections with the side plates 10 so that the height of the cut may be adjusted.

The hollow handle bar 37 is preferably rectangular in cross section, with its lower end secured between channeled bracket members 38, which are mounted between lugs 39 struck from the side plates 10. The cross head 40 is secured to the bar 37 by a clamping member 41 and a single bolt 42 serves to secure the cross head and at the same time to secure the member 41 to the bar.

In the modification shown in Figure 5, the rearward extension 36ª of the frame is formed as an integral part of the side plate and the roller 33ª is adjustably connected therewith by the pin and slot connection 37ª. The arm 31ª extends directly upwardly from the flanges 29 between the adjusting screws 32ª.

In the modification shown in Figure 6, the wheel 19 is made in substantially the same form as that shown in Figures 2 and 3, but the internal gear teeth 25ª are formed in a ring which is made separately and secured within the inside surface of the rim 23 of the wheel.

From the foregoing description, it will be seen that substantially the entire lawn mower, except the cutting blades, is made from sheet metal, chiefly by die cutting and stamping operations, and is therefore adapted to be produced on a large scale at a very low cost. Its light weight not only insures a minimum cost for the material from which it is made, but makes the mower easy to operate and yet the shape of the ground wheel rims insures adequate traction. The manner in which the bed knife is supported throughout its entire length makes it possible to adjust it uniformly and accurately, insuring uniform wear and a clean cut.

While I have described the invention in detail, including several modifications, it will be understood that this is merely illustrative and that the invention also includes such other variations and modifications as may fall within the scope of the appended claims.

What I claim is—

In a lawn mower of the type which has a traction driven rotary cutter, a ground wheel therefor comprising a central bearing sleeve formed with a peripheral flange, a sheet metal plate secured to said flange transverse to the axis of rotation, a stamped tubular tread portion integral with said plate and having spurs stamped from the inner face of the tubular portion toward the circular center line thereof to form integral gear teeth.

JAMES M. LEAKE.